United States Patent [19]

Gustafson, Jr. et al.

[11] Patent Number: 5,287,551
[45] Date of Patent: Feb. 15, 1994

[54] RADIO COMMUNICATION APPARATUS AND METHOD FOR VOICE CHANNEL BUSY CALL BACK

[75] Inventors: Leslie G. Gustafson, Jr., Oakwood Hills; Sewim F. Ablay, Hoffman Estates; Mark L. Shaughnesy, Algonquin all of Ill.

[73] Assignee: Motorola, Inc., Schaumburg, Ill.

[21] Appl. No.: 964,578

[22] Filed: Oct. 21, 1992

Related U.S. Application Data

[63] Continuation of Ser. No. 612,052, Nov. 13, 1990, abandoned.

[51] Int. Cl.$^5$ .............................................. H04B 7/00
[52] U.S. Cl. ................................. 455/54.1; 455/33.1; 455/58.1; 379/63
[58] Field of Search ................. 455/33.1, 33.2, 34.1, 455/34.2, 53.1, 54.2, 56.1, 58.2; 379/58, 59, 60, 63

[56] References Cited

U.S. PATENT DOCUMENTS

| | | | |
|---|---|---|---|
| 4,129,749 | 12/1978 | Goldman | 379/63 |
| 4,599,490 | 7/1986 | Cornell et al. | 379/60 |
| 4,612,415 | 9/1986 | Zdunek et al. | 455/56 |
| 4,682,387 | 7/1987 | Childress et al. | 455/32.1 |
| 4,723,264 | 2/1988 | Sasuta et al. | 379/58 |
| 4,817,126 | 3/1989 | Hendershot | 379/58 |
| 4,829,554 | 5/1989 | Barnes et al. | 455/33 |
| 4,837,858 | 6/1989 | Ablay et al. | 455/34 |
| 4,890,315 | 12/1989 | Bendixen et al. | 379/58 |
| 4,947,421 | 8/1990 | Toy et al. | 379/67 |

OTHER PUBLICATIONS

LTR 8000 Repeater Manual-E. F. Johnson Co.-discloses the operation of their Logic Trunked Radio (LTR) system as well as the features specific to the 8000 model series of repeaters and mobiles. Specific focus should be drawn to the concept of 'home repeater busy' functionality described in § 3.5, which discloses a method of routing system traffic away from a home repeater which is actively transmitting a call prior to the request for that channel.

Primary Examiner—Reinhard J. Eisenzopf
Assistant Examiner—Edward Urban
Attorney, Agent, or Firm—James A. Coffing; Raymond A. Jenski; Joseph P. Krause

[57] ABSTRACT

An apparatus and method for issuing busy call-backs (146) on the voice channel to busied communication units (209,211) on a trunked radio communication system (200) is disclosed. This is accomplished, in part, by issuing a busy signal (104), via a control resource (203), to a communication unit when a requested communication resource is unavailable. Additionally, the radio communication unit (209,211) is capable of receiving the busy signal via the control resource (213) and participating in a second communication while in a busied state. The resource controller (201) is capable of allowing the busied communication unit (209,211) to participate in a second communication on a second communication resource (215) and issuing the call-back signal during the second communication.

15 Claims, 5 Drawing Sheets

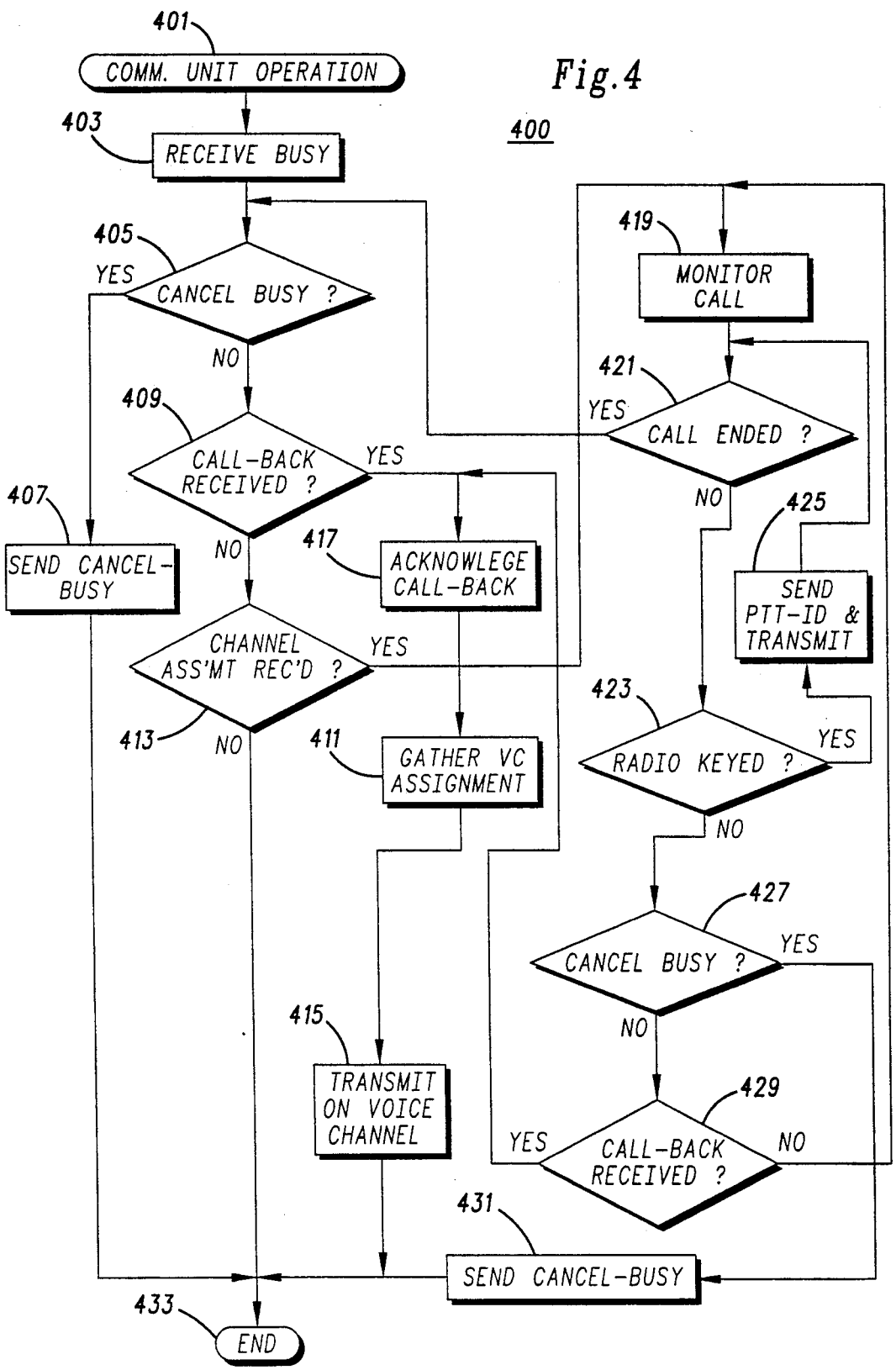

RADIO COMMUNICATION APPARATUS AND METHOD FOR VOICE CHANNEL BUSY CALL BACK

This is a continuation of application Ser. No. 07/612,052, filed Nov. 13, 1990 and now abandoned.

FIELD OF THE INVENTION

The invention relates generally to trunked radio communication systems, and includes, but is not limited to trunked radio communication systems which allow a busied unit to participate in subsequent communications while waiting for their busy call-back signal.

BACKGROUND OF THE INVENTION

FIG. 2A shows a simplified block diagram of a typical trunked radio system 200. In such systems, access to communication resources, for example voice channels, is controlled by a central resource controller, for example 201. This resource controller is usually coupled, for example via wireline, to a plurality of repeaters such as 203, 205, and 207. Resources, or channels, are requested through a dedicated repeater acting as a control resource, for example 203. When a resource is requested by a communication unit, such as portables 209 or mobiles 211, an available channel 215 will be chosen and assigned via a channel assignment to that unit. Today, this is generally accomplished by transmitting data via a control resource or channel. An example of such a transmission is given in FIG. 2A and indicated by transmission 213.

If a communication resource is not available, a "busy" will be issued and repeated on the control channel until the time that a suitable voice channel becomes available and an assignment can be issued. Once a busy is issued to, and received by, a communication unit, that particular unit cannot leave the control channel to be involved in any other call as it may then miss the assignment for the call originally requested. These calls may be a variety of types, for example group dispatch, individual dispatch, or telephone interconnect calls. The aforementioned voice channel requests, busies, and channel assignment grants are accomplished by repetitious signals being transmitted on the control resource, or control channel. These transmissions on the control resource are known in the art as inbound signalling words (ISW), which originate at the communication units, and outbound signalling words (OSW), which originate at the resource controller.

In the arena of radio frequency (RF) communication, trunked systems can be found in all different sizes. A smaller system may have as few as two repeaters, one of which may be used for voice/data transmission and the other remaining channel may be dedicated to the transmission of control signals, such as OSWs and ISWs. Large scale trunked communication systems, on the other hand, may have as many as 28 channels, 27 of which may be used for voice/data transmission and the remaining channel used for transmitting control signals. In a larger system, such as the one described having 28 channels, there may be as many as two thousand communication units being served on that system. It is not difficult to imagine the control traffic congestion that occurs when even a fraction of these radios are requesting access to a voice channel for communication.

In today's trunked communication systems, a busied communication unit, that is, a subscriber unit whose channel request has been denied until a channel of the type requested becomes available, is "locked-in" on the control channel until his request is granted, or he cancels his request. For a group dispatch call, these busies may typically last anywhere from one-half second to eight seconds, depending on the traffic load of the system at the time of the request. The actual call, defined as that which begins with the pressing of the push-to-talk (PTT) button and ending with the release of that button, typically last on the order of twenty seconds. For a telephone interconnect call, which may last anywhere from five minutes to 30 minutes, the busy duration is typically between one and four minutes. It is not difficult to see that the typical duration of a busy can be a significant portion of the total transmission time for a given call type. In a worst case scenario, the actual busy duration may exceed the total call duration. This is often the case on a heavily loaded system having only one control resource, or channel.

Accordingly, there exists a need for a trunked communication system that can, through the use of reduced OSW traffic and enhanced subscriber unit channel assignment methods, make efficient use of limited resources available during times of heavy usage.

SUMMARY OF THE INVENTION

The present invention encompasses a radio communication system having at least one resource controller which is able to allocate a plurality of communication resources. This is accomplished, in part, by issuing a busy signal, via a control resource, to a communication unit when a requested communication resource is unavailable. The communication unit is capable of requesting access to communication resources in order to participate in a communication. Additionally, the radio communication unit is capable of receiving the busy signal on the control resource and participating in a second communication while in a busied state. The resource controller is capable of allowing the busied communication unit to participate in a second communication on a second communication resource and issuing a call-back signal directed to the busied communication unit during, or after, the second communication.

BRIEF DESCRIPTION OF THE DRAWINGS

FIG. 4 is a flow diagram detailing the operation of the communication, in accordance with the present invention.

DETAILED DESCRIPTION OF A PREFERRED EMBODIMENT

Figure 1A:
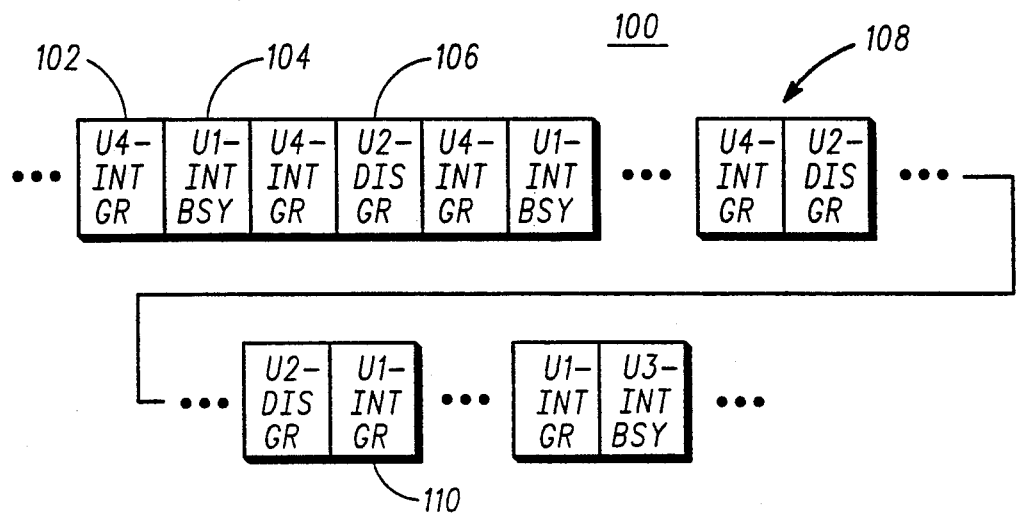
FIGS. 1A-B are timing diagram showing the contents of typical outbound signalling words, inbound signalling words, and voice channel data, in accordance with the present invention.
Figure 1B:
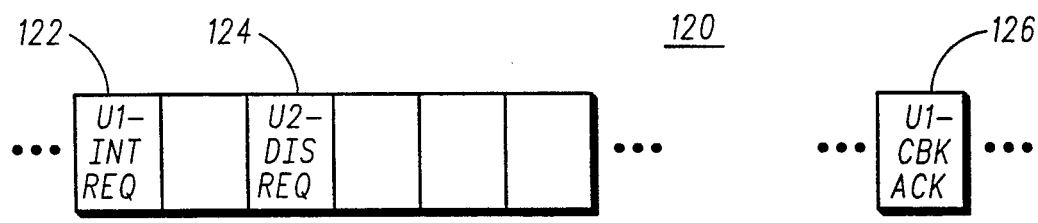

FIGS. 1A-B show two communication control packet streams 100 and 120, transmitted on the outbound and inbound control channel, respectively. Each packet in the packet stream represents a distinct message being sent to or received by some part of the trunked communication system. Packet stream 100 represents an OSW on the control channel. Packet 102 represents an interconnect resource grant for a user, for example user-four, which is repeated for the duration of that interconnect call. At the same time, packet stream 120 representing an ISW, packet 122 shows user-one making an interconnect call request for channel assignment. Assuming there are no telephone interconnect-capable channels available, the resource controller responds to user-one's request by issuing an interconnect busy at packet 104. In a typical trunked communication system, this interconnect busy signal is repeated in a cyclic manner until the requested interconnect resource becomes available. Under these conditions, areas 108 of packet stream 100 would contain repetitious interconnect busy signals directed to user-one, as in packet 104. In the preferred embodiment of the invention, this busy is issued a finite number of times, for example four times. In this case, areas 108 would have no such repetitious interconnect busy signals directed to user-one, thereby effectively reducing the traffic on the outbound control channel. Referring back to packet stream 120, packet 124 shows a dispatch call request initiated by user-two. Because there is a dispatch call channel available on the system, the resource controller issues a dispatch call channel assignment grant directed to user-two at packet 106. Outbound signalling words continue in a cyclic pattern, adding new information updates as they become available on the system. During this time, there may be a call request initiated by a user on the system which invites the participation of user-one. In the preferred embodiment of the invention, user-one is allowed to participate in that call and is switched to the appropriate voice channel while remaining in a busied, or wait, state for the original request. In order for this to occur without causing problems on the system, the resource controller must keep track of all such busied (i.e., denied) requests currently on the system. This task is performed using a standard first-in-first-out (FIFO) queuing process, the order of which queue is dynamically altered by the resource controller based on predetermined priority criterion.

Figure 1C:
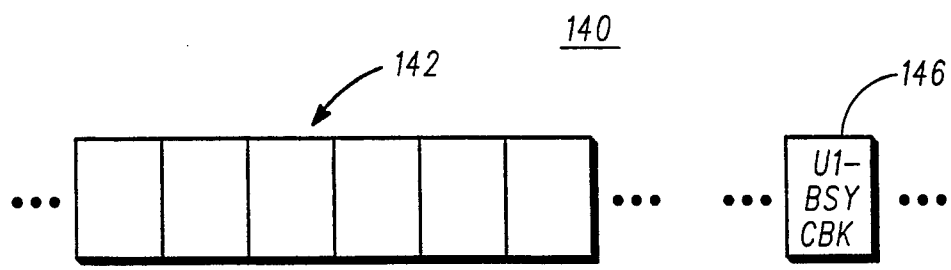
Figure 2A:
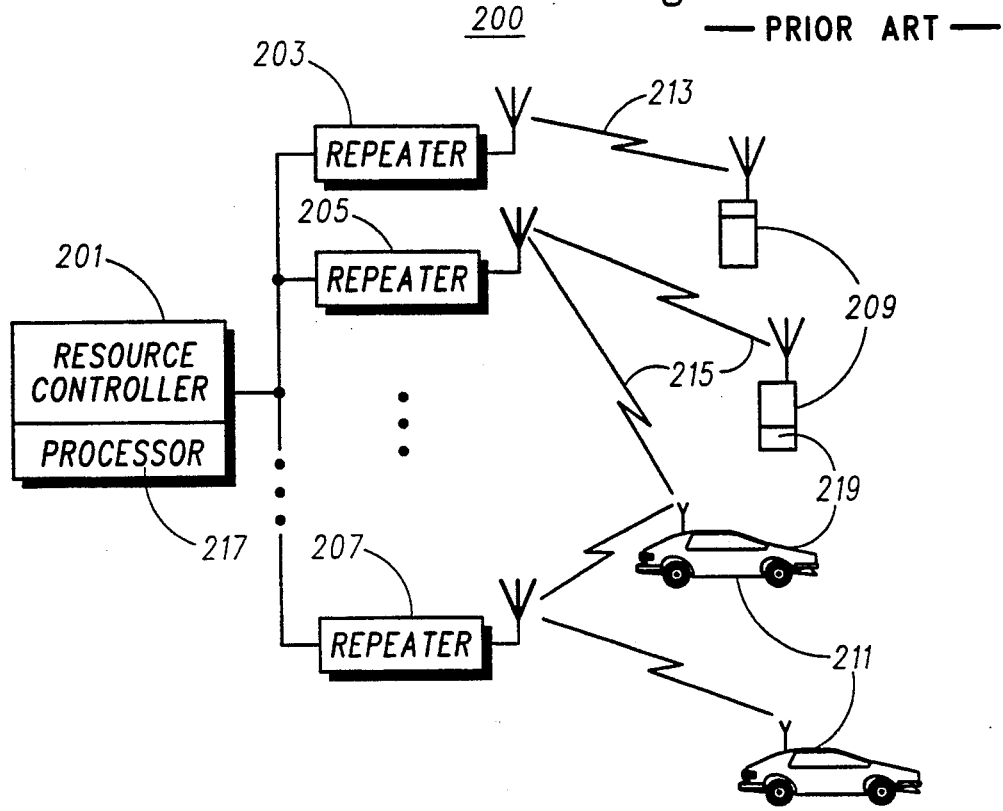
FIG. 2A is a simplified block diagram of a trunked radio system which is well known in the art.
Figure 2B:
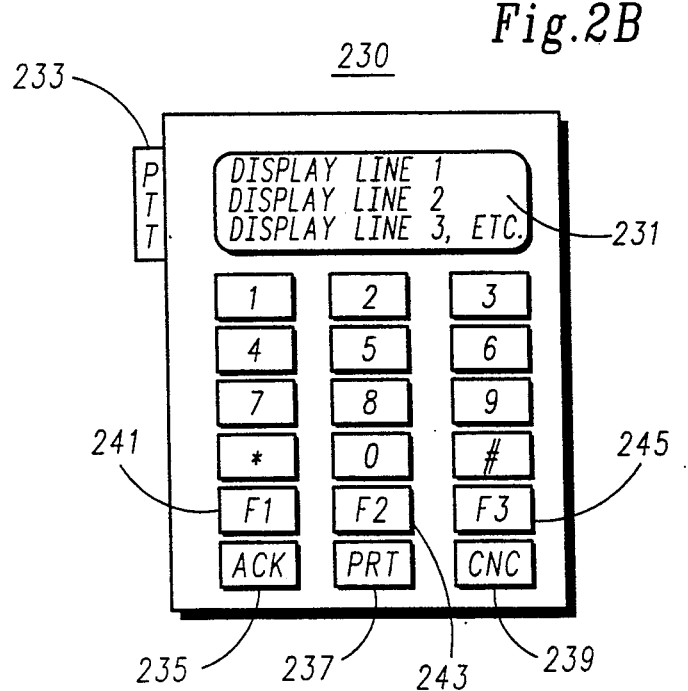
FIG. 2B is a simplified block diagram of a communication unit, in accordance with the invention.

Referring to FIG. 1C, stream 140 shows typical voice data 142 transmitted via a voice channel. When an interconnect resource becomes available, the resource controller issues an interconnect grant 110 directed to user one on the outbound control channel, and then issues an interconnect call-back directed to user-one, for example on the voice channel at packet 146. Referring back to packet stream 120, packet 126 represents the acknowledgement of receipt of the interconnect call-back by user-one. This acknowledgement may include the pushing of one or more buttons on the communication unit 230 of FIG. 2B, for example the 'ACK' button 235, followed by either the 'PRT' button 237 if the user wants to participate in the originally requested call, or the 'CNC' button 239 if the user wishes to cancel the original request. Other buttons 241, 243, and 245 are shown which may be used for other functions in accordance with the invention.

Figure 3A:
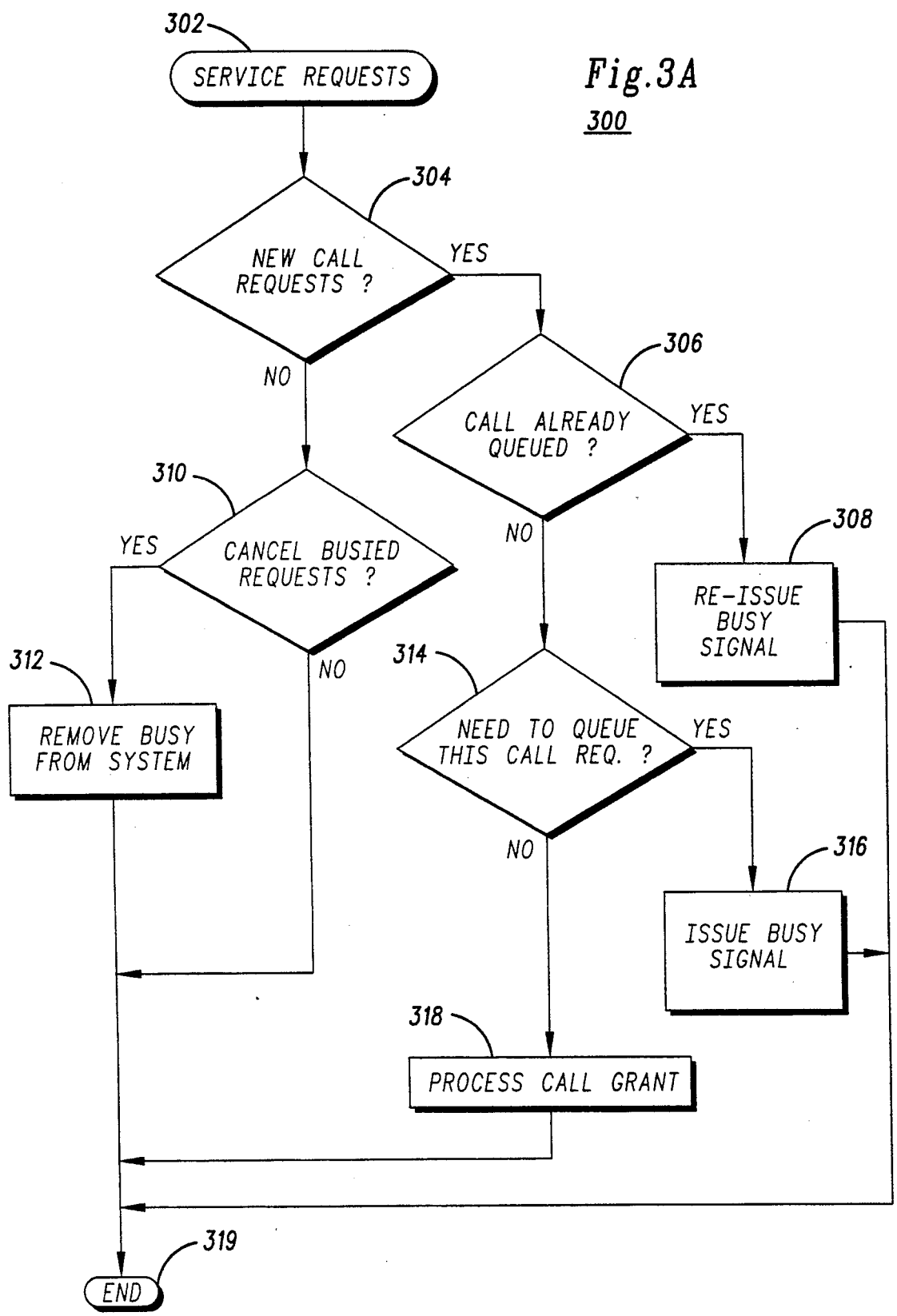
FIG. 3A is a flow diagram detailing the operation of the resource controller performing the task of servicing requests by a communication unit, in accordance with the invention.
Figure 3B:
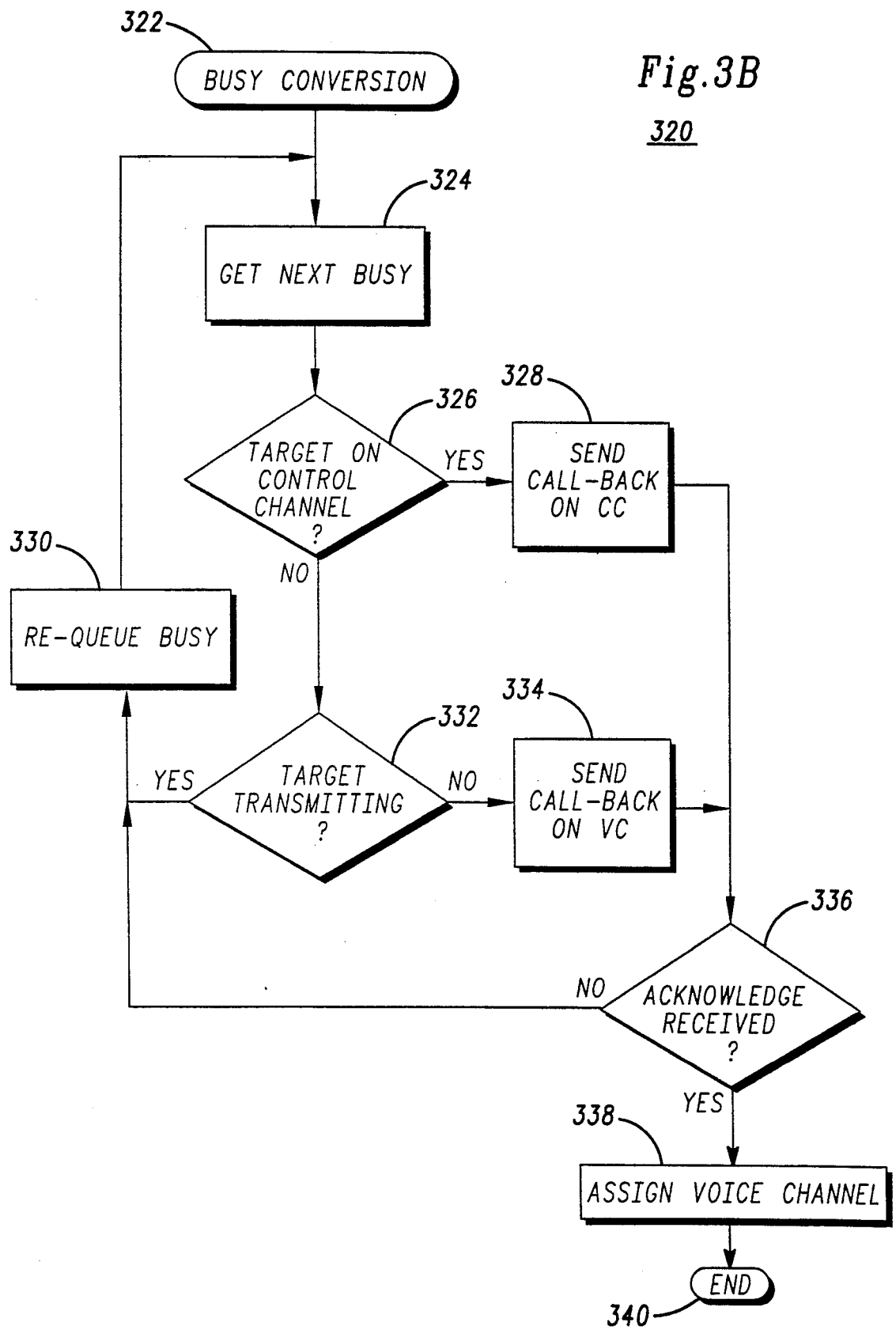
FIG. 3B is a flow diagram detailing the operation of the resource controller performing the task of converting busied requests into channel assignments, in accordance with the invention.

The steps executed by the microprocessor 217 at the resource controller 201 are shown in FIGS. 3A and 3B. Referring to FIG. 3A, flow chart 300 shows the relationship of the requisite steps performed by the resource controller in servicing requests made by the communication unit. At the time when a request is to be serviced at 302, the routine proceeds to a decision at 304, which determines whether or not the request is for a new call. If it is a new call request, the routine proceeds to another decision at 306, where it is then determined whether or not this call has already been put on the queue. If this call has been queued already, the resource controller re-issues the busy signal at 308 and the routine is exited at 319. In the case where the call has not already been queued, the routine proceeds to a decision at 314, where it is determined whether or not there is a need to queue this call request. When a communication resource is available, there is no need to queue the request and the resource controller simply processes the call grant at 318, and the routine is exited at 319. If the request cannot be granted, as is the case when there are no available communication resources of the type requested, the resource controller issues a busy signal at 316 and the routine is exited at 319. Referring back to decision 304, if the request being serviced is not for a new call, the routine proceeds to decision 310, where it attempts to determine if the issued busy is being cancelled by the communication unit that has been busied. If there is no such cancel request, the routine is exited at 319. If there is a request to cancel the busy, the resource controller proceeds by removing the busy from the system at 312, and the routine is exited at 319.

FIG. 3B shows a flow chart 320 that describes the sequence of events for converting busies on the system 200, in the preferred embodiment of the invention. Busy conversion routine 322 begins by getting, from the queue, the next busy at 324. The routine then proceeds to decision 326, where it is determined whether or not the busied, or target, unit is currently on the control channel. If the target is on the control channel, the resource controller sends a call-back signal on the control channel at 328. The routine then proceeds to decision 336, where it is determined whether or not the issued call-back signal has been acknowledged by the communication unit. If no such acknowledgement has been received, the resource controller re-queues the busy at 330, up to a predetermined maximum number of times, and the routine proceeds to the top of the busy conversion routine at 322. If the call-back signal has been acknowledged, the resource controller assigns the previously busied communication unit to a voice channel at 338, and exits the routine at 340. Referring back to decision 326, if the target communication unit is not currently on the control channel, the routine proceeds to decision 332, where it is determined whether or not the target unit is transmitting. If the target unit is transmitting, the resource controller re-queues the busy at 330, up to a predetermined maximum number of times, and the routine proceeds to the top of the busy conversion routine at 322. In the case where the target unit is not transmitting, the resource controller sends at 334 the call-back signal on the voice channel that the target unit is monitoring. The routine then proceeds to decision 336, where it is determined whether or not the call-back signal has been acknowledged by the communications unit. If the call-back has not been acknowledged, the resource controller re-queues the busy at 330, up to a predetermined maximum number of times, and the routine returns to the top of the busy conversion routine at 322. If the acknowledge has been received from the communication unit, the resource controller assigns a voice channel to the communication unit at 338 and the routine is exited at 340.

FIG. 4 shows a flow chart 400 which describes the operation of the microprocessor 219 at the communication unit, in the preferred embodiment of the invention. Operation 401 begins when the communication unit, for example 230, first receives the busy signal from the resource controller at 403. The routine then proceeds to decision 405, where it is determined whether or not the busied request is to be cancelled. If the request is to be cancelled, the communication unit sends a cancel busy signal at 407, which may be initiated by the user of the communication unit, and exits the routine at 433. If the busied request is not to be cancelled, the routine proceeds to decision 409, where it is determined whether or not a call-back signal for that busied request has been received. If the call-back signal has not been received, the routine then proceeds to decision 413, where it determines whether or not the channel assignment has been received. If the channel assignment has not been received, the routine is then exited at 433. If a channel assignment has been received, the communication unit monitors the call on the assigned voice channel at 419, after which the routine proceeds to decision 421, where it is determined whether or not the call being monitored has ended. If the call has ended, the routine returns to the decision point at 405, near the beginning of the described operation at 401. If the call has not ended, the routine proceeds to decision 423, where it is determined whether or not the communication unit 230, or radio, has been keyed, for example by depressing the units push-to-talk button 233. If the radio has been keyed, the communication unit sends a code, for example its PTT-ID, and transmits on the voice channel at 425. In those systems not having PTT-ID capability, decision 423 is bypassed. In this case, or in the case where the radio is not keyed, the routine proceeds to decision 427, where it is determined whether or not the busied request is to be cancelled. If the busied request is to be cancelled, the communication unit sends a cancel busy signal at 431, and exits the routine at 433. If the busied request is not to be cancelled, the routine proceeds to decision 429, where it is determined whether or not a call-back signal has been received by the resource controller. Receipt of call-back may be supplemented, for example, by an audible tone generated by the called-back unit, or through the use of a display 231 showing the user which of his requests are being serviced. If no such call-back has been received, the communication unit continues to monitor the call at 419. If the call-back signal has been received, the communication unit acknowledges the call-back at 417, for example when the user presses the 'ACK' button 235. The user then either cancels the original request, for example by pressing the 'CNC' button 239, or participates in the originally requested communication by pressing the 'PRT' button 237. Then the communication unit gathers the voice channel assignment at 411, transmits a message on the voice channel at 415, and the routine is exited at 433. Referring back to decision 409, if a call-back signal has been received from the resource controller, the communication unit acknowledges the call-back signal at 417, gathers the voice channel assignment at 411, transmits a message on the voice channel at 415, and the routine is exited at 433.

In general, the present invention allows for a multi-threaded environment, where the communication unit may initiate, or participate in, a second communication on a voice channel while in a busied state resulting from an earlier request. This is made possible by adding new functional elements to both the communication, or subscriber, unit and the central resource controller, per the invention. In addition, the invention seeks to minimize control channel traffic by reducing redundancy in information generally transmitted via OSWs on the control channel. By significantly reducing the amount of traffic on the control channel, the invention allows for further expansion of a given trunked communication system and allows for a much more efficient use of the available resources on today's systems.

The benefits obtained through the use of the invention can be summarized into two categories. The first involves direct gains seen from the communication unit user's perspective, and the second involves the benefits seen by the resource controller. From the users perspective, since the communication unit no longer must sit idle waiting i.e. in a wait state, for a channel assignment, the user is free to participate in other communications, thereby increasing his own productivity through efficient use of the system. Furthermore, by reducing inbound control channel traffic on systems experiencing long interconnect busy queues, use of the invention precludes the possibility of frustrated users continuously requesting interconnect channels only to reject the busy and try again later due to the lengthy idle waits they must endure. From the resource controller's perspective, the significant reduction of outbound control channel traffic is achieved by limiting the number of busy OSW repeats. As such, more control channel time slots are then open for other operations, for example status messages, additional voice channel assignments, or other new features. Furthermore, multi-system scans with large scan lists can be achieved much faster since communication units spend less time on a control channel to receive a complete OSW cycle.

What is claimed is:

1. A radio communication system having at least one resource controller which is able to allocate a plurality of communication resources and issue a busy signal, via a control resource, to a communication unit when a requested communication resource is unavailable, the communication unit being able to request access to a first communication resource in order to participate in a first communication, the radio communication system comprising:

means at the communication unit for receiving the busy signal on the control resource, thereby producing a denied communication unit and placing said denied communication unit in a wait state upon receipt of the busy signal;

means at the resource controller for allowing said denied communication unit to monitor a second communication on a second communication resource;

means at said denied communication unit for participating in said second communication, while remaining in said wait state; and means at the resource controller for issuing, when a communication resource of the type requested by said denied communication unit becomes available, a call-back signal directed to said denied communication unit during the second communication, thereby giving the denied communication unit access to the available communication resource.

2. A radio communication system in accordance with claim 1, further comprising means at the communication unit, responsive to said call-back signal, for generating an audible tone.

3. A radio communication system in accordance with claim 1, further comprising means at said busied communication unit for acknowledging said call-back signal.

4. A radio communication system in accordance with claim 1, further comprising means at the resource controller for issuing said call-back signal on the control resource.

5. A radio communication system in accordance with claim 1, further comprising means at the communication unit for cancelling the request for the first communication resource.

6. A radio communication system in accordance with claim 1, further comprising means at the communication unit for participating in the first communication.

7. A radio communication unit which is able to request, via a control resource, access to a first communication resource in order to engage in a first communication, and is further able to receive a plurality of signals from a resource controller, the radio communication unit further comprising:
    means for receiving a busy signal from the resource controller when the first communication resource is unavailable, thereby producing a denied communication unit and placing said denied communication unit in a wait state upon receipt of the busy signal;
    at said denied communication unit;
    means for participating in a second communication on a second communication resource, while remaining in said wait state for said first communication resource;
    means for receiving a call-back signal from the resource controller during the second communication when a communication resource of the same type as the first communication resource becomes available, such that the denied communication unit is given access to the available communication resource; and
    means for responding to the call back signal.

8. A radio communication unit in accordance with claim 7, wherein said call-back signal is issued on said second communication resource.

9. A radio communication unit in accordance with claim 7, further comprising means for initiating said second communication on said second communication resource.

10. A radio communication unit in accordance with claim 7, wherein a plurality of requests for communication resources have been denied, further comprising means for generating a list whose elements each correspond to one of said plurality of denied requests.

11. A radio communication unit in accordance with claim 10, further comprising means for displaying the list of denied requests.

12. A radio communication resource controller which is able to allocate communication resources via a control resource, and send a plurality of signals to a communication unit requesting to participate in a first communication on a first communication resource, the signals comprising a busy signal and a call-back signal, the radio communication resource controller further comprising:
    means for issuing the busy signal to the communication unit when the first communication resource is unavailable, thereby producing a denied communication unit and placing said denied communication unit in a wait state upon issuing the busy signal;
    means for allowing the denied communication unit to participate in a second communication on a second communication resource, while said denied communication remains in said wait state; and
    means for issuing a call-back signal on said second communication resource directed to the denied communication unit when a communication resource of the same type as the first communication resource becomes available.

13. A method of communication resource allocation for use in a radio communication system having at least one resource controller and at least two communication units, the resource controller being able to allocate a plurality of communication resources and issue a busy signal, via a control resource, to the at least two communication units when a requested type of communication resource is unavailable, the communication units being able to indicate a need to access a first communication resource in order to engage in a first communication, the method comprising the steps of:
    receiving, at one of the at least two communication units, the busy signal on the control resource, thereby placing a denied communication unit in a wait state;
    allowing said denied communication unit to participate in a second communication on a second communication resource;
    at said denied communication unit, participating in said second communication, while remaining in the wait state; and
    issuing from the resource controller a call-back signal directed to said busied communication unit when a communication resource of the type requested communication resource becomes available.

14. A method of requesting a communication resource for use in a radio communication unit which is able to request access to, via a control resource, a first communication resource in order to engage in a first communication, the communication unit being further able to receive a plurality of signals from a resource controller, the method comprising the steps of:
    receiving a busy signal from the resource controller indicating that a communication resource of a requested type is unavailable, thereby placing a denied communication unit in a wait state;
    at the denied communication unit; participating in a second communication on a second communication resource, while remaining in the wait state;
    receiving, when a communication resource of the type requested becomes available, a call-back signal from the resource controller during the second communication; and
    responding to the call-back signal.

15. A method of communication resource allocation for use in a radio communication resource controller, the resource controller being able to allocate communication resources via a control resource, and send a plurality of signals to a communication unit requesting to participate in a first communication on a first communication resource, the signals comprising a busy signal and a call-back signal, the method comprising the steps of:

issuing the busy signal to the communication unit when the first communication resource is unavailable, thereby producing a denied communication unit and placing said denied communication unit in a wait state;

allowing the denied communication unit to participate in a second communication on a second communication resource, while remaining in the wait state; and issuing the call-back signal on said second communication resource directed to the denied communication unit when a communication resource of the same type as the first communication resource becomes available.

* * * * *

UNITED STATES PATENT AND TRADEMARK OFFICE
CERTIFICATE OF CORRECTION

PATENT NO. : 5,287,551

DATED : February 15, 1994

INVENTOR(S) : Leslie G. Gustafson, Jr. et al.

It is certified that error appears in the above-identified patent and that said Letters Patent is hereby corrected as shown below:

In Claim 13, Col. 8, Line 30, "placing a" should be --producing a denied communication unit and placing said--.

In Claim 13, Col. 8, Line 41, "communication resource" should be deleted.

In Claim 14, Col. 8, Line 51, "placing a" should be --producing a denied communication unit and placing said--.

Signed and Sealed this

Twenty-sixth Day of July, 1994

Attest:

BRUCE LEHMAN

*Attesting Officer*    *Commissioner of Patents and Trademarks*